United States Patent
Uneme

[19]

[11] Patent Number: 6,148,689
[45] Date of Patent: Nov. 21, 2000

[54] ANTI-VIBRATION RESIN STRUCTURE FOR OUTER CABLE END

[75] Inventor: Masato Uneme, Nagoya, Japan

[73] Assignee: Chuo Hatsujo Kabushiki Kaisha, Nagoya, Japan

[21] Appl. No.: 09/313,257

[22] Filed: May 18, 1999

[30] Foreign Application Priority Data

May 18, 1998 [JP] Japan ................................. 10-135594

[51] Int. Cl.[7] .................................................. F16C 1/14
[52] U.S. Cl. ...................... 74/502.1; 74/502.6; 428/465
[58] Field of Search ............................. 74/502.4, 502.6; 428/458, 465, 36.8

[56] References Cited

U.S. PATENT DOCUMENTS

| | | | |
|---|---|---|---|
| 3,916,723 | 11/1975 | Hawtree et al. | 74/502.4 |
| 4,088,156 | 5/1978 | Kubo et al. | 138/109 |
| 4,263,998 | 4/1981 | Moriya | 74/502.6 |
| 4,348,348 | 9/1982 | Bennett et al. | 74/502.6 |
| 4,537,399 | 8/1985 | Adam | 273/75 |
| 4,572,696 | 2/1986 | Morikawa | 403/265 |
| 4,721,637 | 1/1988 | Suzuki et al. | 428/36 |
| 4,951,523 | 8/1990 | Shiota et al. | 74/502.5 |
| 4,978,572 | 12/1990 | Akao | 428/323 |
| 5,122,420 | 6/1992 | Baron et al. | 428/474 |
| 5,299,669 | 4/1994 | Pepping et al. | 188/379 |
| 5,484,848 | 1/1996 | Jadamus et al. | 525/105 |
| 5,500,473 | 3/1996 | Wissmann | 524/447 |
| 5,579,663 | 12/1996 | Likich et al. | 74/502.5 |
| 5,588,468 | 12/1996 | Pfleger | 138/121 |
| 5,759,113 | 6/1998 | Lai et al. | 473/321 |
| 5,939,179 | 8/1999 | Yano et al. | 428/212 |

FOREIGN PATENT DOCUMENTS 5-57424  7/1993  Japan .

OTHER PUBLICATIONS

Crystallinity and Microstructure in Injection Moldings of Isotactic Polypropylenes; X. Guo, A. I. Isayev, and I. Guo; Polymer Engineering and Science, vol. 39, No. 10, Oct. 1999.

Studies on Morphology and Crystallization of Polypropylene/polyamide 12 blends; Tao Tang, Zhongli Lei, and Baotong Huang; Polymer; vol. 37, No. 15, Jan. 1996.

Amide modified polybutylene terephthalate: structure and properties; Bennekom and Gaymans; Polymer; vol. 38, No. 3, Jan. 1997.

Crystallization in modified blends of polyamide and polypropylene; Piglowski, Gancarz, Wlazlak, and Kammer; Polymer; vol. 38, Jan. 2000.

Crystallinity and Microstructure in Injection Moldings of Isotactic Polypropylenes; Guo, Isayev, and Demiray; Polymer Engineering and Science, Nov. 1999.

Morphological changes in polyamide/PVP blends; Clark, Kander, and Srinivas; Polymer; vol. 39, No. 3, Jan. 1998.

Primary Examiner—David A. Bucci
Assistant Examiner—Chong H. Kim
Attorney, Agent, or Firm—Morgan, Lewis & Bockius LLP

[57] ABSTRACT

In an anti-vibration resin structure for outer cable end, a casing cap (10) is provided in which an end of an outer cable (3) of a control cable (2) is placed to teleoperate a device. An anti-vibration cushion (20) is molded around the casing cap (10) to absorb vibration from the outer cable (3). A shield cushion (30) is molded around the anti-vibration cushion (20) so as to fasten it to a partition of a motor vehicle. A polyamide material is used to the shield cushion (30), a crystallization degree of the polyamide material falls in the range of 16~25%. This retains the predetermined characteristics with the anti-vibration cushion (20), and thus insuring the anti-vibration cushion (20) with a stable vibration absorption property.

7 Claims, 5 Drawing Sheets

ANTI-VIBRATION RESIN STRUCTURE FOR OUTER CABLE END

BACKGROUND OF THE INVENTION

1. Field of the Invention

The invention relates to an anti-vibration resin structure used in a vehicular compartment to fasten an outer cable end through which an accelerator cable passes when introducing the accelerator cable in an engine room to an accelerator pedal in the compartment, and particularly concerns to an anti-vibration resin structure improved to effectively absorb vibration from the outer cable so as to reduce rattling and noise from the accelerator pedal.

2. Description of Prior Art

In a fastening device provided to fasten an outer cable end of a control cable, an end cap resin structure is disclosed by Laid-open Japanese Utility Model Application No. 5-57424.

The end cap resin structure provides an end pipe in which the outer cable is placed. The end pipe has a flange on which an elastic layer is coated to form a holder (plastic shield) therearound which acts as a main body of an end cap. When fastening the end cap to a mounting plate, the vibration induced from the control cable is absorbed by the elastic layer located between the end pipe and the holder.

In this instance, the holder is made from a synthetic resin, and located around the elastic layer. The holder is quickly produced by means of a mold formation.

However, the elastic layer is subjected to a significant amount of mold pressure when forming the holder around the elastic layer. The elastic layer is additionally exposed to the shrinkage pressure after the synthetic resin is molded. For this reason, the characteristics of the elastic layer changes after forming the holder to render it difficult to maintain the elastic layer with a predetermined elasticity as anticipated.

There have been rare studies about the influence on the elastic layer when molding the holder. Even when an elastic layer itself has appropriate characteristics inherently, once the elastic layer is incorporated into the end cap resin structure, it has been difficult to satisfactorily insure the elastic layer with the vibration absorption property as expected.

Therefore, the present invention has made with the above drawbacks in mind, it is a main object of the invention to provide an anti-vibration resin structure in which an elastic layer is placed between a metal casing of an outer cable and a plastic shield attached to a fastening member.

It is a further object of the invention to provide an anti-vibration resin structure which is capable of insuring an anti-vibration elastic resin with a satisfactory vibration absorption property while facilitaing to produce the plastic shield.

SUMMARY OF THE INVENTION

According to the present invention, there is provided an anti-vibration resin structure for outer cable end having an anti-vibration elastic resin molded around a cylindrical metal casing to absorb vibration from an outer cable. A plastic shield is molded around the anti-vibration elastic resin so as to fasten it to a fastening member. A polyamide material is used to the plastic shield, a crystallization degree of the polyamide material being in the range of 16~25%.

With the crystallization degree adopted for the polyamide material in the range of 16~25%, it is possible to insure the plastic shield with a significantly small shrinkage after the synthetic resin is molded. This makes it possible to secure a significantly small clamping force against the anti-vibration elastic resin after the synthetic resin is molded around the anti-vibration elastic resin. This makes the anti-vibration elastic resin substantially immune to the pressure from the plastic shield. Once a necessary characteristics is insured with the synthetic resin (elastomer) upon molding the anti-vibration elastic resin, it is possible to achieve a predetermined vibration absorption property as expected after molding the plastic shield. With the use of molding formation, it is possible to facilitate the production.

The plastic materials appropriate for the plastic shield, polyamide 6-12 or polyamide 12 is preferable.

With the crystallization degree adopted for the polyamide material in the range of 16~25%, it is not necessary to apply a large intensity of pressure due to a good fluidity upon molding the plastic shield. For this reason, it is possible to mold the plastic shield with ease under the pressure as low as 300 kgf/cm$^2$ at the time of impleenting the injection mold formation.

This obviates an extra pressure from applying to the anti-vibration elastic resin upon injection the synthetic resin to form the plastic shield around the anti-vibration elastic resin, while at the same time, preventing the anti-vibration elastic resin from partially displaced, which would otherwise offset the anti-vibration elastic resin within an injection mold die. This retains the predetermined characteristics with the anti-vibration elastic resin as expected, and thus insuring the anti-vibration elastic resin with a stable vibration absorption property.

With a plurality of apertures defined on the plastic shield to expose the anti-vibration elastic resin therethrough, it is possible to reduce the clamping force of the plastic shield against the anti-vibration elastic resin. Even from this point of view, this contributorily insures the anti-vibration elastic resin with a stable vibration absorption property.

BRIEF DESCRIPTION OF THE DRAWINGS

A preferred form of the present invention is illustrated in the accompanying drawings in which.

DETAILED DESCRIPTION OF THE PREFERRED EMBODIMENTS

Figure 1:
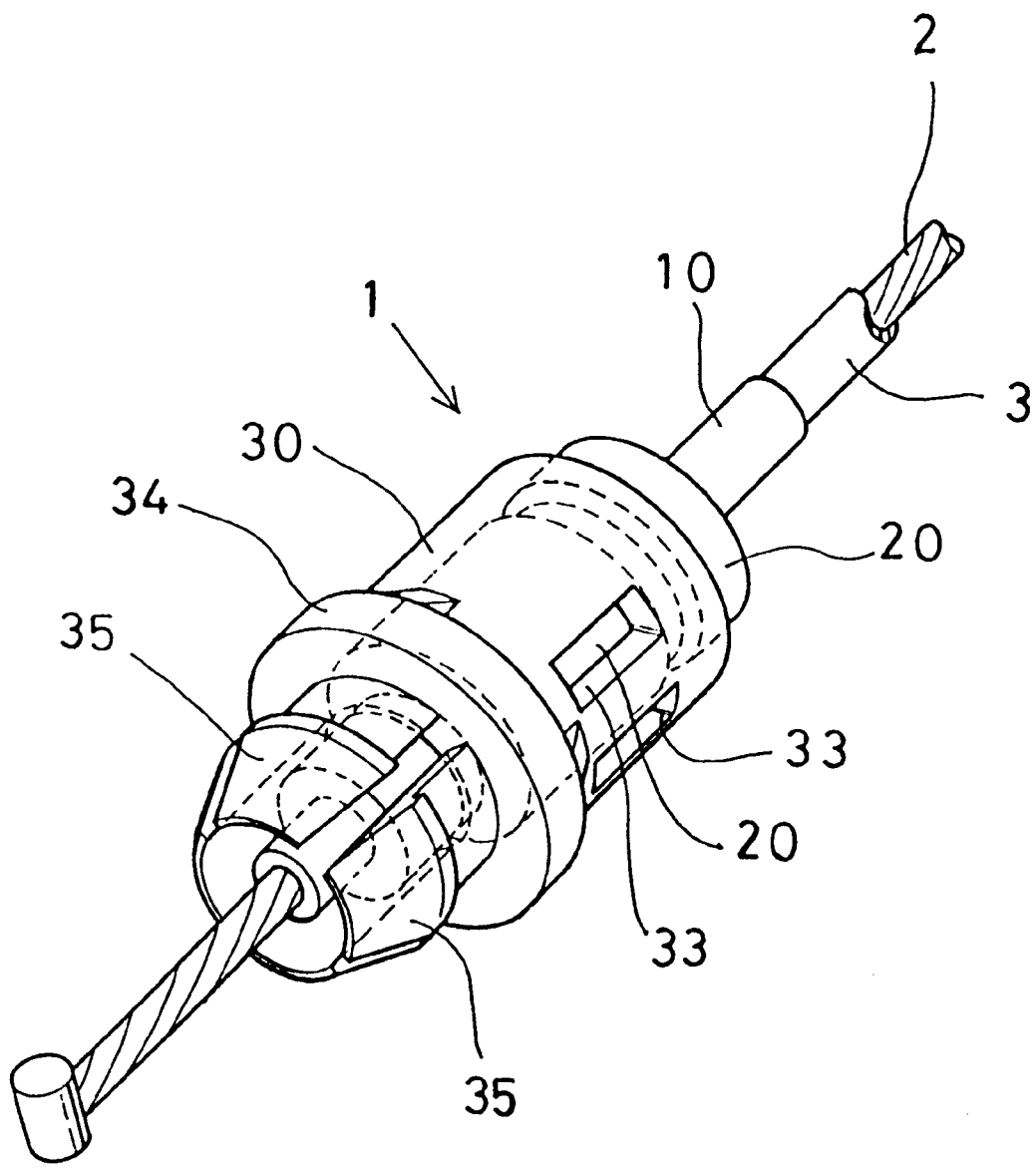
FIG. 1 is a perspective view of an end cap for an outer cable according to an embodiment of the invention.
Figure 4:
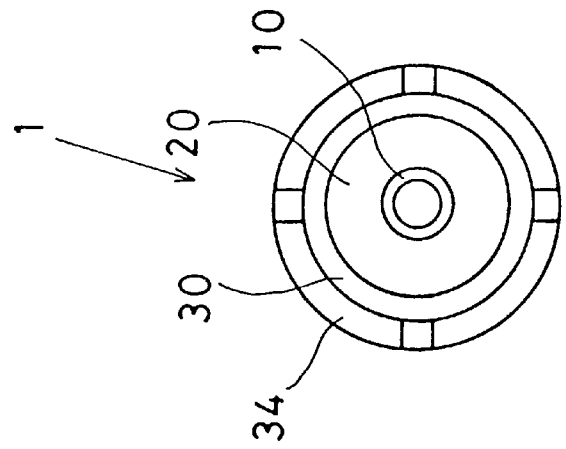
FIG. 4 is a rear elevational view of the end cap for the outer cable.
Figure 3:
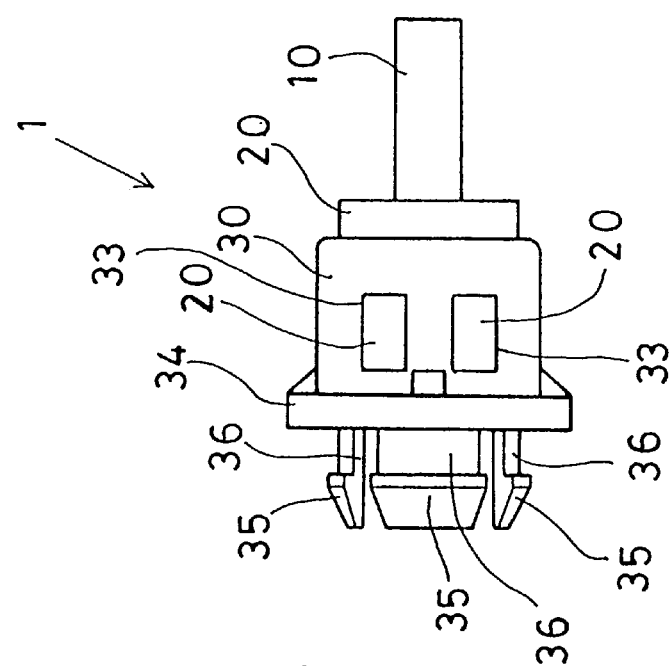
FIG. 3 is a side elevational view of the end cap for the outer cable.
Figure 2:
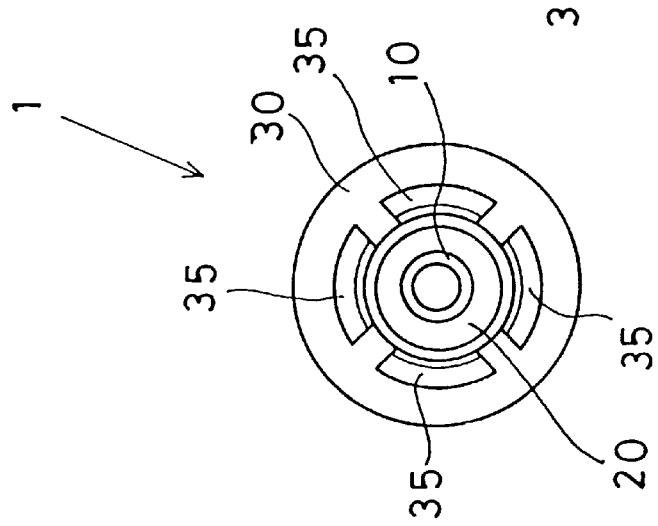
FIG. 2 is a plan view of the end cap for the outer cable.
Figure 6:
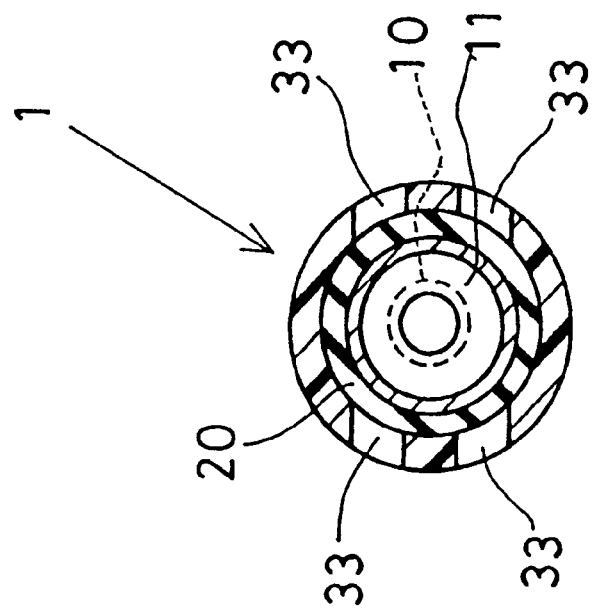
FIG. 6 is a cross sectional view along the line X—X.

Referring to FIG. 1 which shows an end cap 1 for an outer cable, the end cap 1 acts as an anti-vibration resin structure for outer cable end which is used to fasten an end portion of an outer cable 3 at a partition between an engine room and a compartment in a motor vehicle. Through the outer cable 3, an accelerator cable (control cable) 2 movably passes to connect a carburetor in the engine room to an accelerator pedal in the compartment.

As shown in FIGS. 2~6, the end cap 1 has a casing cap (metal casing) 10, an anti-vibration cushion (anti-vibration elastic resin) 20 and a shield cushion (plastic shield) 30 which is in turn molded to be in integral with each other.

Figure 8:
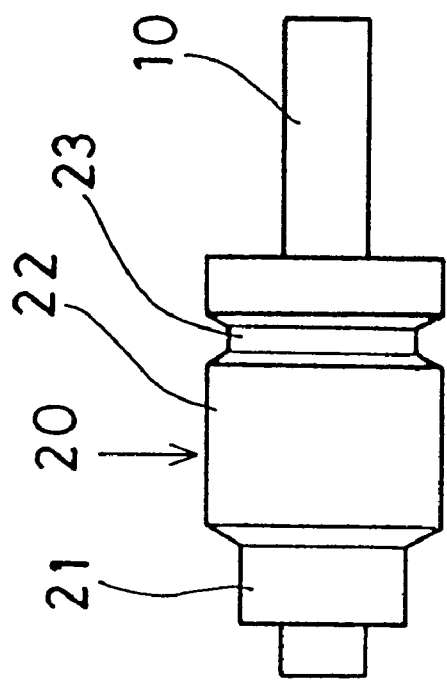
FIGS. 7 and 8 are schematic views showing how an anti-vibration cushion is molded to a casing cap.
Figure 7:
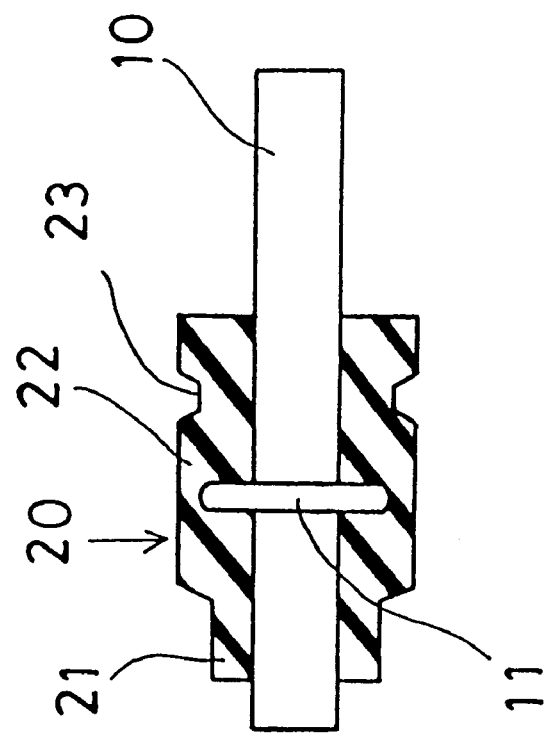
Figure 9:
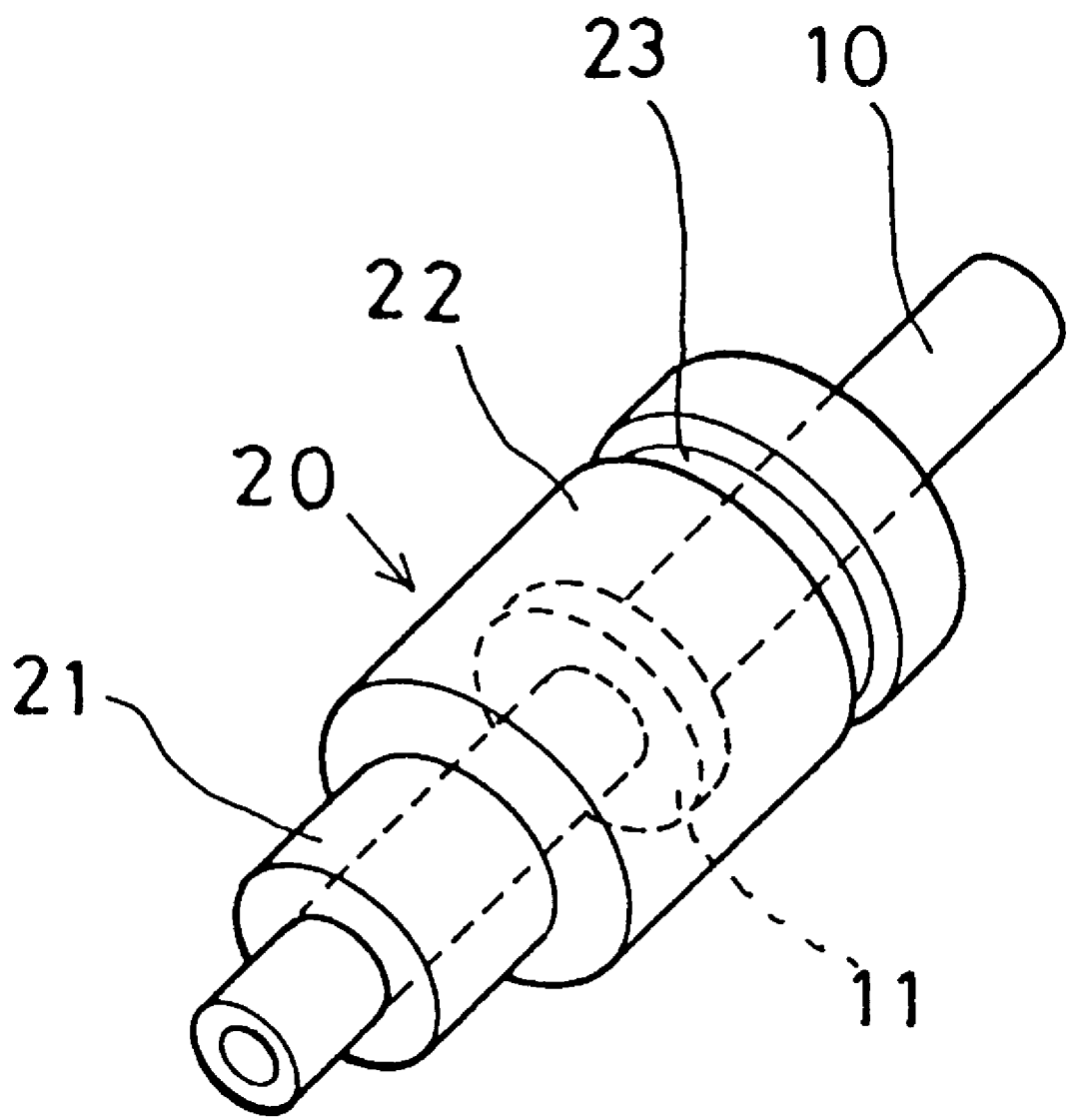
FIG. 9 is a perspective view of the end cap with the anti-vibration cushion molded to the casing cap.

The casing cap 10 is made from an aluminum or iron pipe which is cold forged to have a flange 11 at a middle portion thereof as shown in FIGS. 7~8.

The anti-vibration cushion 20 is in the form of a cylindrical shape having a diameter-enlarged section 22 and a diameter-reduced section 21. From both ends of the anti-vibration cushion 20, the casing cap 10 extends axially. A groove 23 which is trapezoidal in section, is provided on the diameter-enlarged section 22 of the anti-vibration cushion 20.

The anti-vibration cushion 20 is formed by injecting the synthetic resin (rubber) into a mold die in which the casing cap 10 is placed. This makes the casing cap 10 integral with the anti-vibration cushion 20 by means of the injection mold, in which the anti-vibration cushion 20 is tightly engages with the casing cap 10. The flange 11 molded with the anti-vibration cushion 20 is efficient to prevent the casing cap 10 from slipping axially particularly when a considerable amount of load is accidentally applied to the accelerator cable 2.

In the end cap 1, it is desirable for the anti-vibration cushion 20 to absorb the vibration induced from the accelerator cable 2 in the engine room.

For this purpose, ERD-based rubber is used to impart the anti-vibration cushion 20 with a good vibration absorption property. The ERD-based rubber has 40~45% degrees in hardness which is prepared by mixing 40~48% rubber, 20~24% rubber reinforcement (filler) and 32~28% vulcanized oil. Otherwise, the ERD-based rubber has 40~45 degrees in hardness which is prepared by mixing 40~55% rubber, 26~29% rubber reinforcement (filler) and 10~20% vulcanized oil. The oil added herein is to maintain the characteristics of the rubber.

In order to improve the durability of the shield cushion 30 by maintaining the inherent property of the shield cushion 30, the constituent agents are used which is unlikely to permeate from the anti-vibration cushion 20 into the shield cushion 30.

In more concrete terms, the addition of the vulcanizing accelerator and the deterioration retardant agent in the rubber are under 3% by weight.

The shield cushion 30 made integral with the casing cap 10 and the anti-vibration cushion 20 is placed within a mold die, and united together by means of the injection mold.

Due to the reason that the shield cushion 30 is molded around the anti-vibration cushion 20, it is desirable not to influence on an elastic constant of the anti-vibration cushion 20 during and after molding the anti-vibration cushion 20.

When the rubber material (N 45) was used to the anti-vibration cushion 20, several experimental tests were carried out by changing the constituents of the shield cushion 30. A static elasticity constant (Ks), dynamic elasticity constant (Kd), dynamic factor (Kd/Ks), coefficient of mechanical loss (tan δ) and cable POA (vibration factor) of the anti-vibration cushion 20 were measured as regards intermediate products in which the anti-vibration cushion 20 was mold, and complete products in which the shield cushion 30 was finally mold.

Experimental test results are shown in Table 1.

TABLE 1

|  | POM | 66-PA | 6–12 PA |
| --- | --- | --- | --- |
| intermediate product |  |  |  |
| KS | 13.8 | 13.8 | 13.8 |
| KD | 33.79 | 33.79 | 33.79 |
| (100 Hz vibration) |  |  |  |
| KD/KS | 245 | 245 | 245 |
| tanδ | 0.144 | 0.144 | 0.144 |
| complete product |  |  |  |
| KS | 41.7 | 33.3 | 27.8 |
| KD | 49.53 | 51.60 | 45.93 |
| (100 Hz vibration) |  |  |  |
| KD/KS | 1.18 | 1.55 | 1.65 |
| tanδ | 0.167 | 0.172 | 0.171 |
| cable POA (dB) | −26.83 | −30.55 | −39.28 |
| (40 ~ 250 Hz) |  |  |  |

The crystallization degree of the synthetic resin used to the shield cushion 30 is shown in Table 2.

TABLE 2

|  | crystallization degree (theoretic value) |
| --- | --- |
| POM | 45 ~ 50% |
| 66-PA | 30 ~ 33% |
| 6–12 PA | 19 ~ 21% |
| 12 PA | 16 ~ 27% |

The results indicate that the variance of the elasticity constant of the anti-vibration cushion 20 decreases as the crystallization degree of the synthetic resin used to the shield cushion 30 is mitigated.

This is because highly crystallized synthetic resin shrinks more after solidified while less crystallized synthetic resin shrinks less so as to decrease the clamping force against the anti-vibration cushion 20.

Taking the results into consideration, the vibration absorption synthetic resin appropriate for the shield cushion 30 is directed to polyamide (nylon) which has a small amount of mold shrinkage with the crystallization degree at 16~25%. In more concrete terms, polyamide 6-12 or polyamide 12 is selected as the synthetic resin appropriate for the shield cushion 30.

From the reason that the small amount of mold shrinkage is insured with the shield cushion 30, it is possible to reduce the clamping force against the anti-vibration cushion 20. This leads to mitigating the variance of the elasticity constant of the anti-vibration cushion 20 before and after implementing the injection mold.

The shield cushion 30 is molded around the anti-vibration cushion 20 so that the pressure is applied from the shield cushion 30 to the anti-vibration cushion 20 upon implementing the injection mold. If the pressure is lessened, it is possible to decrease the variance of the elasticity constant of the anti-vibration cushion 20 due to the injection mold when forming the shield cushion 30.

For the polyamide 6-12 or polyamide 12, the injection mold has usually been implemented under the relatively high pressure of 350~1400 kgf/cm$^2$. Under these high pressures, it is feared that the synthetic resin is partially injected in the mold die to form an offset portion upon molding the anti-vibration cushion 20 so as to induce defects and unevenness in the thickness direction of the shield cushion 30.

An experimental test was carried out to check how the mold pressure affects on the anti-vibration cushion 20 at the time of molding the shield cushion 30.

Experimental test results are indicated in Table 3.

TABLE 3

| injection pressure | 600 Kg/cm$^2$ | 200 Kg/cm$^2$ |
|---|---|---|
| Ks | 33.3 | 27.8 |
| Kd | 49.43 | 45.93 |
| tanδ | 0.086 | 0.171 |
| cable POA (dB) | −36.97 | −39.28 |
| offset of anti-vibration cushion | presence | absence |

The results show that when the shield cushion 30 is molded under lower injection pressures, the variance of the elasticity constant of the anti-vibration cushion 20 decreases while significantly reducing the offset portion of the anti-vibration cushion 20 induced in the mold die.

Taking the results into consideration, the shield cushion 30 is molded under the lower pressure of 200~250 kgf/cm$^2$. Due to the good fluidity of the polyamide 6-12 and polyamide 12, it is possible to implement the mold injection under such a low pressure while substantially removing the offset portion of the anti-vibration cushion 20 induced in the mold die. As a result, it is possible to insure the anti-vibration cushion 20 with the predetermined vibration absorption property by mitigating the variance of the elasticity constant of the anti-vibration cushion 20 before and after molding the shield cushion 30.

Figure 5:
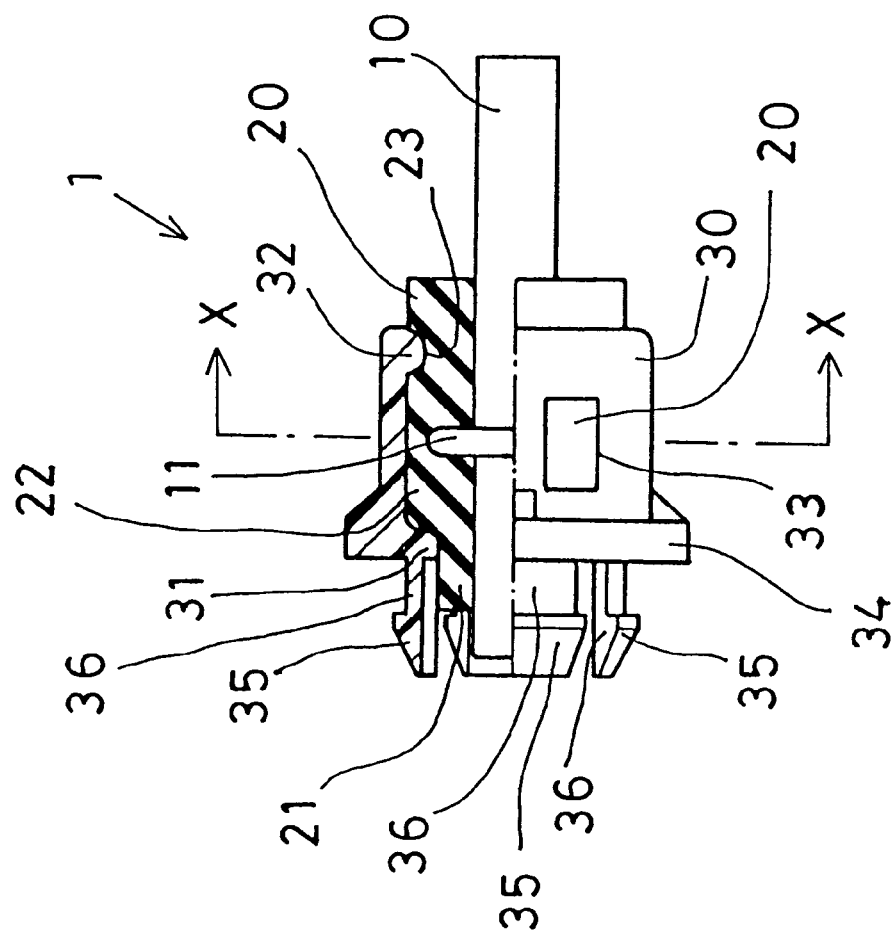
FIG. 5 is a side cross sectional view of the end cap for the outer cable.

Switching the subject back to the structure of the shield cushion 30, as shown in FIG. 5, an inner wall of the shield cushion 30 has a ledge portion 31 and a ring portion 32. The ledge portion 31 engages with a stepped section between the diameter-enlarged section 22 and the diameter-reduced section 21. The ring portion 32 engages with the groove 23 defined in the anti-vibration cushion 20. The ledge portion 31 and the ring portion 32 make the shield cushion 30 tight against the anti-vibration cushion 20 while preventing the shield cushion 30 from slipping axially along anti-vibration cushion 20.

On the shield cushion 30, a plurality of rectangular apertures 33 are provided which are located between the ledge portion 31 and the ring portion 32. The apertures 33 expose the anti-vibration cushion 20 therethrough.

The apertures 33 serves as a pressure reliever which relieves a considerable amount of pressure which otherwise would be applied to the anti-vibration cushion 20 when molding the shield cushion 30.

With the apertures 33 provided on the shield cushion 30, it is possible to reduce the variance of the elasticity constant of the anti-vibration cushion 20 before and after molding the shield cushion 30 when compared to the case in which the apertures 33 are not provided.

On the ledge portion 31 of the shield cushion 30, an outer flange 34 is provided to be brought into engagement with the partition when the end cap 1 is installed. From the ledge portion 31, interfitting segments 36 are axially extended, each of which has an elastic claw 35.

In the end cap 1, the end section of the outer cable 3 is interfit into the casing cap 10 so that only the accelerator cable 2 can move through the outer cable 3.

As understood from the foregoing description, the crystallization degree of the polyamide 6-12 or polyamide 12 used to the shield cushion 30 is in the range of 16~25%. This makes it possible to insure the shield cushion 30 with a significantly small shrinkage after the synthetic resin is molded. This leads to securing a significantly small clamping force against the anti-vibration cushion 20 after the synthetic resin is molded around the anti-vibration cushion 20. This makes the anti-vibration cushion 20 substantially immune to the pressure from the shield cushion 30. Once a necessary characteristics is achieved with the synthetic resin upon molding the anti-vibration cushion 20, it is possible to attain a predetermined vibration absorption property as expected after molding the shield cushion 30.

With the crystallization degree adopted for the polyamide material in the range of 16~25%, it is not necessary to apply a large intensity of pressure due to a good fluidity upon molding the shield cushion 30. For this reason, it is possible to mold the shield cushion 30 with ease under the pressure as low as 300 kgf/cm$^2$ at the time of implementing the injection mold formation.

This obviates an extra pressure from applying to the anti-vibration cushion 20 upon injection the synthetic resin to form the shield cushion 30 around the anti-vibration cushion 20, while at the same time, preventing the anti-vibration cushion 20 from partially displaced, which would otherwise offset the anti-vibration cushion 20 within the injection mold die. This retains the predetermined characteristics with the anti-vibration cushion 20 as anticipated, and thus insuring the anti-vibration cushion 20 with a stable vibration absorption property.

With the plurality of apertures 33 defined on the shield cushion 30 to expose the anti-vibration cushion 20 therethrough, it is possible to reduce the clamping force of the shield cushion 30 against the anti-vibration cushion 20. Even from this point of view, this contributorily insures the anti-vibration cushion 20 with a stable vibration absorption property.

It is to be noted that instead of the accelerator cable 2 for the motor vehicle, other types of cables can be used to teleoperate mechanical control devices.

While there has been described what is at present thought to be preferred embodiments of the invention, it will be understood that modifications may be made therein and it is intended to cover in the appended claims all such modifications which fall within the scope of the invention.

What is claimed is:

1. An anti-vibration resin structure for outer cable end comprising:
    a cylindrical metal casing connectable to an end of an outer cable of a control cable;
    an anti-vibration elastic resin molded around the cylindrical metal casing to absorb vibration from the outer cable;
    a plastic shield molded around the anti-vibration elastic resin so as to fasten the plastic shield to a fastening member; and
    a polyamide material being used to the plastic shield, a crystallization degree of the polyamide material being in the range of 16~25%.

2. An anti-vibration resin structure as recited in claim 1, wherein the plastic shield is made of polyamide 6-12 or polyamide 12.

3. An anti-vibration resin structure as recited in claim 1, wherein the plastic shield is provided by means of an injection mold under the pressure of 300 kgf/cm$^2$ or less.

4. An anti-vibration resin structure as recited in claim 2, wherein the plastic shield is provided by means of an injection mold under the pressure of 300 kgf/cm$^2$ or less.

5. An anti-vibration resin structure as recited in claim 1, wherein a plurality of apertures are provided on the plastic shield to expose the anti-vibration elastic resin therethrough.

6. An anti-vibration resin structure as recited in claim 2, wherein a plurality of apertures are provided on the plastic shield to expose the anti-vibration elastic resin therethrough.

7. An anti-vibration resin structure as recited in claim 3, wherein a plurality of apertures are provided on the plastic shield to expose the anti-vibration elastic resin therethrough.

* * * * *